Patented July 31, 1951

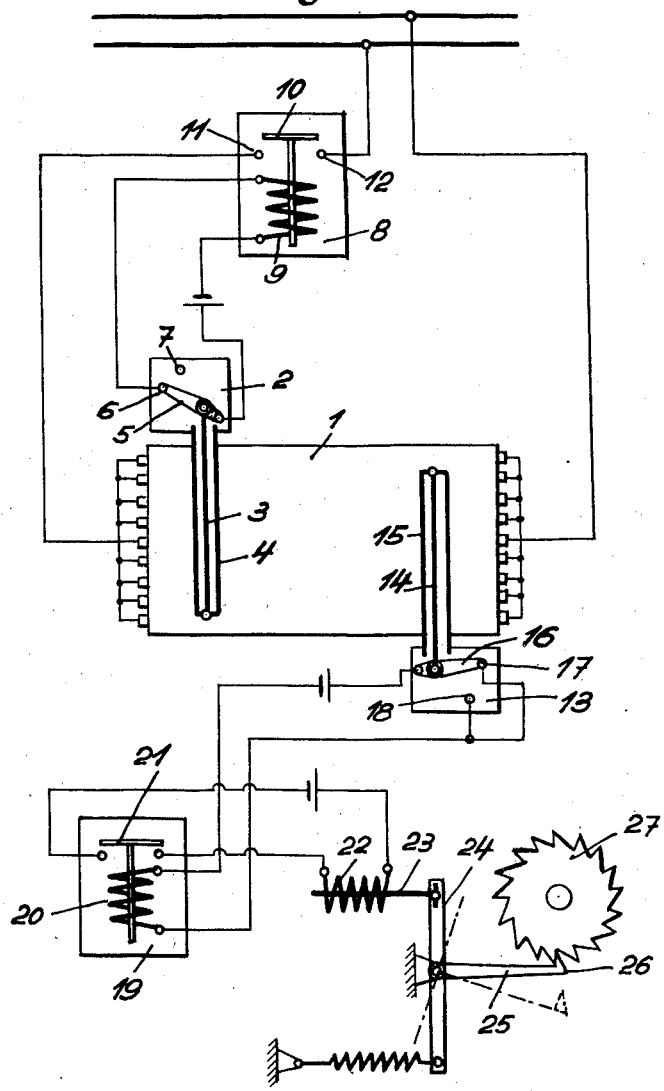

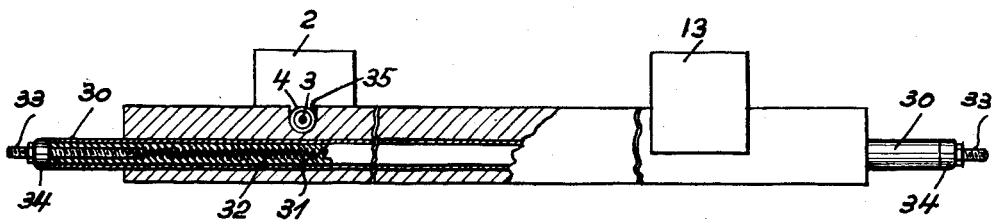
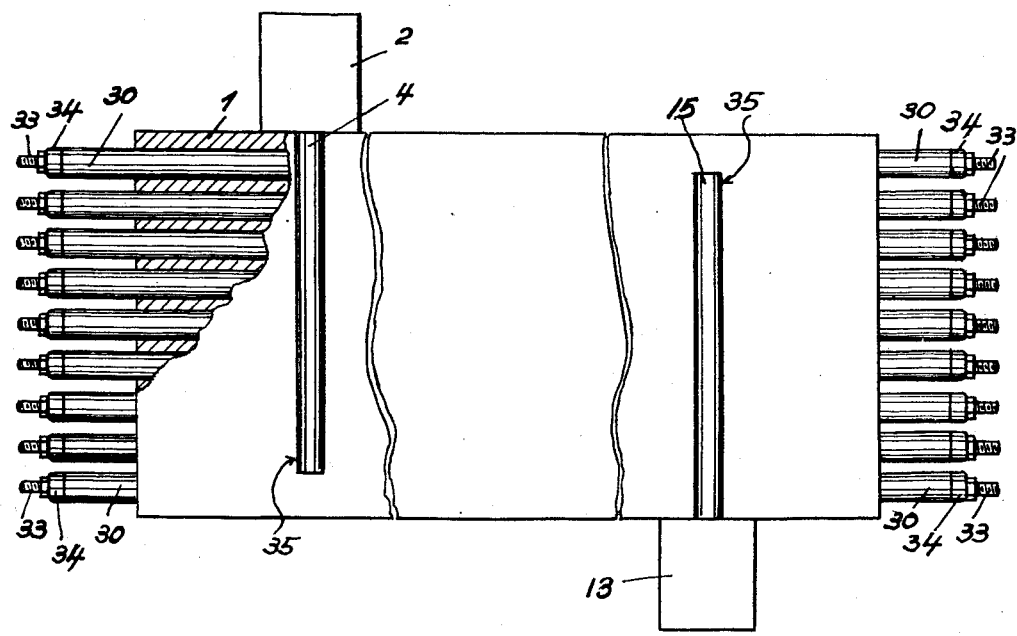

2,562,399

UNITED STATES PATENT OFFICE 2,562,399

PRESS FOR WORKING MATERIALS UNDER PREDETERMINED TEMPERATURE CONDITIONS

Friedrich Josef Trözmüller, Vienna, Austria, assignor to "Semperit" Oesterreichisch-Amerikanische Gummiwerke Aktiengesellschaft Application July 17, 1947, Serial No. 761,541
In Germany December 5, 1941

Section 1, Public Law 690, August 8, 1946
Patent expires December 5, 1961

3 Claims. (Cl. 18—17)

1

The invention relates to presses for material to be worked under predetermined temperature conditions, such as, in particular, rubber or artificial masses.

Processes for working rubber and artificial masses, irrespective of whether a stamping or vulcanizing process is concerned, require a closely limited range of temperature during the working operation. The temperature range, within which these processes have to take place, lies, as a rule, between 125° and 130° C. and these limits have strictly to be observed in order not to jeopardize the polymerisation or vulcanization, and thus to spoil the products obtained.

The majority of the known presses of this kind are equipped with temperature regulators for automatically maintaining the required temperature, and mostly also with an ordinary thermometer arranged in the heatable stamping plates for additional control. These means cannot, however, prevent the press from being operated too early in consequence of negligence in control, viz. before the working temperature is reached, or the working temperature from being exceeded because of a failure of the regulator. In both cases the material is spoiled by too low a temperature or by overheating.

According to the invention this drawback is overcome by providing means for blocking or releasing the press in dependence on the temperature of the heating plates. The operation of the press is blocked as long as the required temperature is not reached, and is again blocked, if the temperature has reached the predetermined upper limit. Thus the press may only be operated within the admissible temperature range.

Within the scope of the invention there are various possibilities for carrying out said automatic blocking of the press. An embodiment of the invention will now be described, by way of example, in connection with a blocking arrangement of a hand operated press, e. g. an eccentric press, which is operated by turning round a hand lever.

In the drawings:

Fig. 1 illustrates diagrammatically the installation of the blocking arrangement.

Fig. 2 is a vertical section, at an enlarged scale, through the heating plate shown in Fig. 1.

Fig. 3 a plan view of the heating plate, partly in section, shown in Fig. 2.

Like reference characters denote like parts in the several figures of the drawings.

Upon an electrically heated heating plate 1 of a press a temperature responsive element 2 is arranged, which is provided with a metal bar 3 serving as a heat feeler enclosed in a casing 4.

2

The bar 3 and the casing 4 are made of different materials and owing to their different coefficients of heat expansion according to the temperature of heating plate 1, they have a difference of length transmitted to the switch lever 5, which by means of the contact 6 and the breaking contact 7 switches on or off an electric circuit in which is provided a switch relay 8 of usual commercial design, the magnetic coil 9 of which is energized or de-energized and closes or opens by means of a bridge 10, and the contacts 11 and 12 in the heating circuit for heating plate 1. This arrangement substantially maintains the heating plate 1 at a predetermined constant temperature. The contacts 6 and 7 should therefore be as near as possible to each other to keep the switching range of the regulator as narrow as possible.

In order to block automatically, according to the invention, the operation of the press outside the required working temperature the heating plate 1 is provided with a second temperature responsive element 13 which is, in the same way as regulator 2, influenced by the temperature of the heating plate, and moves a switch lever 16 by the difference in expansion of the metal bar 14 and its casing 15. The switch lever 16 closes, by means of the contacts 17 and 18, an electric circuit. As this element has to perform an equal operation, whether the temperature is too low or too high, the contacts 17 and 18 are short-circuited. The range of regulation is kept somewhat wider than with the element 2, and the contacts 17 and 18 are therefore somewhat farther removed from each other. Within the electric circuit a relay 19 is provided having a magnetic coil 20 and contact bridge 21 by which a second circuit may be closed, which operates an electromagnet 22, and thereby moves the iron core 23 of the electromagnet. To the iron core 23 a three-armed lever 24 is linked, whose arm 25 being at right angles to the other two arms is provided with a ratchet tooth 26, which may be brought into engagement with a gear wheel 27 fitted e. g. upon the eccentric shaft of the press. When no current flows through the electromagnet 22, a tension spring 28 brings the lever 24 into the position in which the ratchet tooth 26 releases the gear wheel 27 for operation of the press.

The operation of this embodiment is as follows:

Before the heating current is switched on, the switch lever 5 is in contact with the contact 6 of the secondary source of current, and the switch lever 16 in contact with the contact 17 likewise connected to a secondary source of current.

Thus, the relay coil 9 is excited and the contacts 11 and 12 of the heating circuit are closed, and the relay coil 20 is energized and the circuit of the magnetic coil 22 is closed by means of the contact bridge 21. The iron core 23 holds the ratchet tooth 26 of the lever arm 25 in engagement with the ratchet wheel 27 of the operating means of the press. During the heating up of press plate 1 the switch lever 5 travels under the influence of the temperature responsive element 4, towards the breaking contact 7, reaching said breaking contact as soon as the working temperature required, e. g. 125° C., is reached, and interrupting the heating current. The switch lever 16 has simultaneously left the contact 17 under the influence of the temperature responsive element 14, 15, and thereby interrupted the current through the coil 20. The relay coil 20 releases its armature 21 and the electromagnet 22 is then deenergized, its armature is released and the spring 28 pulls back the lever 25, so that the operating means of the press is released. If, in consequence of a failure of the temperature responsive element 2, 3, 4, e. g. of the switch lever 5 remaining in the circuit closing position, the temperature of heating plate 1 increases to the highest admissible limit, the switch lever 16, while continuing to travel, closes its secondary circuit through the contact 18, and thereby renders the blocking means of the press operative. This indicates that the temperature regulation is not properly functioning and that for the material to be worked there is the danger of over-heating. By immediately interrupting the heating current, the operating means of the press is again released. After the decrease of temperature of the heating plate the failure of the temperature responsive element may be removed and the operation of the press continued.

With the magnetic coil 22 may also be connected an acoustic or optical signal so as to indicate the moment of the blocking operation also acoustically or optically. If the device is to be provided e. g. on presses operated by a motor (hydraulic presses), the switch relay may be directly connected to the pump motor, so as e. g. to cut off the supply of current to the pump motor if the temperature falls below the minimum or exceeds the maximum value, whereby likewise a blocking of the press may be effected. In the embodiment shown it may be assumed that the ratchet wheel 27 must rotate in a clockwise direction to open the press and rotate in a counterclockwise direction to close the press. Thus, the press may be opened at all times regardless of the position of the ratchet tooth 26, but may be closed in pressing operation only when the tooth is out of engagement with the wheel.

The same result may also be realized in a different manner, e. g. by the well-known mercury switching thermometer, whereby the mercury column will actuate the switch relay within two adjustable temperature limits, so that the press is either blocked or released for working.

The heating plates used for stamping and vulcanizing presses have essentially the construction shown in Figs. 2 and 3. The heating bars 30 are cast into the plate 1 made of aluminum or aluminum alloys. Each of these heating bars consists of a steel tube filled with insulating material 31, in which a heating spiral 32 is imbedded. The ends of the heating spiral are hard soldered to threaded spindles 33 supported at the ends of the tubes in insulating pieces 34. At the free ends of the threaded spindles the current is supplied.

Grooves 35 in the upper surface of the plate are provided for supporting the heat feelers 3, 4, or 14, 15, respectively, of the temperature responsive elements 2, or 13, respectively.

While the invention has been shown in the particular embodiment described it is not limited thereto, as modifications thereof may be made without departing from the scope of the appended claims.

I claim:

1. In a press for performing pressing operations within a predetermined temperature range including a heatable press plate, pressing operation blocking means including an electromagnetic relay and a latch actuatable by the relay, a temperature responsive element provided in the press plate, a switch relay connected to said temperature responsive element and in circuit with said electromagnetic relay, said temperature responsive element being adapted for actuating said switch relay in such a way that the latch is released by the said electromagnetic relay only within the predetermined temperature range.

2. In a press for performing pressing operations within a predetermined temperature range including a heatable press plate, pressing operation blocking means including a latch, a temperature responsive element provided in the press plate, a switch relay connected to said temperature responsive element, a magnetic coil controlled by said switch relay, and a magnetic core actuated by said coil, said magnetic core being coupled with said blocking means, said temperature responsive element being adapted for actuating said switch relay in such a way that said latch is released by the said magnetic coil and core only within the predetermined temperature range.

3. In a press for performing pressing operations within a predetermined temperature range including a heatable press plate, pressing operation blocking means including a latch, electromagnetic means retaining said latch in engaged position when energized, and a spring biasing said latch away from engaged position, electrical heating means for the plate, a temperature responsive element provided in the press plate in circuit with said electromagnetic means and connected to said temperature responsive element, said temperature responsive element being adapted for actuating said switch relay to energize said electromagnetic means and disengage said latch only within the predetermined temperature range, a second temperature responsive element and a second switch relay connected to said second temperature responsive element, said second element being adapted for interrupting the current of said second switch relay, when the temperature required for the operation of said press is reached, said second switch relay being adapted to control the current in said heating means.

FRIEDRICH JOSEF TRÖZMÜLLER.

REFERENCES CITED

The following references are of record in the file of this patent:

UNITED STATES PATENTS

| Number | Name | Date |
|---|---|---|
| 958,813 | Kelly | May 24, 1910 |
| 2,392,619 | Soderquist | Jan. 8, 1946 |
| 2,432,215 | Stocker | Dec. 9, 1947 |
| 2,482,072 | Soderquist | Sept. 13, 1949 |